(12) United States Patent
Hurlimann (10) Patent No.: US 8,118,474 B2
(45) Date of Patent: Feb. 21, 2012

(54) DEVICE AND METHOD FOR MIXING SUBSTANCES, MIXING REACTOR AND METHOD FOR CONTINUOUSLY EJECTING A TREATED SUBSTANCE USING SAID MIXING REACTOR

(76) Inventor: Hans P. Hurlimann, Herrliberg (CH)

( * ) Notice: Subject to any disclaimer, the term of this patent is extended or adjusted under 35 U.S.C. 154(b) by 1149 days.

(21) Appl. No.: 11/720,502

(22) PCT Filed: Nov. 29, 2005

(86) PCT No.: PCT/CH2005/000708
§ 371 (c)(1),
(2), (4) Date: Jul. 5, 2007

(87) PCT Pub. No.: WO2006/058447
PCT Pub. Date: Jun. 8, 2006

(65) Prior Publication Data
US 2008/0019211 A1 Jan. 24, 2008

(30) Foreign Application Priority Data

Dec. 1, 2004 (CH) ...................................... 1986/04

(51) Int. Cl.
*B01F 15/02* (2006.01)
*B01F 13/06* (2006.01)
*B29B 7/00* (2006.01)
*B29C 47/10* (2006.01)

(52) U.S. Cl. .......... 366/76.6; 366/76.7; 366/77; 366/91; 366/132; 366/139; 366/145; 366/189; 366/190

(58) Field of Classification Search ............... 366/181.1, 366/76.6, 76.7, 132, 139, 145, 189, 190, 366/77, 91
See application file for complete search history.

(56) References Cited

U.S. PATENT DOCUMENTS

| | | | |
|---|---|---|---|
| 49,345 A * | 8/1865 | Hervy | 366/268 |
| 4,350,650 A * | 9/1982 | Cereghini | 264/39 |
| 4,592,711 A | 6/1986 | Capy | |
| 4,620,794 A * | 11/1986 | Leka | 366/131 |
| 5,230,852 A | 7/1993 | Golmanavich | |
| 6,062,722 A * | 5/2000 | Lake | 366/130 |
| 2004/0120217 A1 | 6/2004 | Sentmanat | |
| 2004/0125690 A1 | 7/2004 | Sentmanat | |

FOREIGN PATENT DOCUMENTS

CH 542699 10/1973

(Continued)

*Primary Examiner* — Tony G Soohoo
(74) *Attorney, Agent, or Firm* — Rankin, Hill & Clark LLP (57) ABSTRACT

The invention relates to a device and to a method for mixing substances, wherein a substance to be treated is pressed with a press piston (3, 4) through a nozzle block (6) arranged between two press cylinders (1, 2). During the mixing, a fixed mixture constituent in the form of a suspension (13) is fed to the substance to be treated. The substance to be treated may be cooled during the mixing process by way of stepwise, controlled evaporation of a process fluid. Preferably, several, differently designed, exchangeable nozzle blocks are used, in order to adapt machine conditions to the changing viscosity of the substance to be mixed. The invention also relates to a mixing reactor and to a method for the continuous discharge of a product. For this, several mixers and an extrusion press are arranged next to one another and connected to one another via a transfer vehicle.

13 Claims, 8 Drawing Sheets

FOREIGN PATENT DOCUMENTS

| | | |
|---|---|---|
| CH | 694015 | 6/2004 |
| DE | 836249 | 4/1952 |
| DE | 1504699 | 10/1970 |
| DE | 1930787 | 1/1971 |
| DE | 8626562 | 7/1990 |
| DE | 4423652 | 1/1996 |
| DE | 20012807 | 9/2000 |
| EP | 0294733 | 12/1988 |
| FR | 2152452 | 4/1973 |
| JP | 06170198 | 6/1994 |

* cited by examiner

DEVICE AND METHOD FOR MIXING SUBSTANCES, MIXING REACTOR AND METHOD FOR CONTINUOUSLY EJECTING A TREATED SUBSTANCE USING SAID MIXING REACTOR

BACKGROUND OF THE INVENTION

The invention relates to a method and to a device for mixing substances, in particular for mixing macromolecular components, such as highly viscoelastic fluids, and mixing in solid mixture components, for example raw rubber and soot. The invention also relates to a mixing reactor and to a method for the continuous discharge of a mixture.

A device of the first mentioned type is known from the document CH 542699. In this, a substance to be treated is pressed by a press cylinder by way of press pistons, through a connection channel into a second press cylinder. The connection channel is located in a nozzle block which is arranged between the press cylinders in a manner in which it may be easily disassembled. This device, compared to blade-mixers for example, has the advantage that in contrast to mixing methods of flowable materials by way of shearing, a finer degree of distribution (striation thickness) and, thus, a more homogenous mixing is achieved in a shorter time. Copiously dissipated process heat which may activate undesirable chemical processes such as the cross-linking of the molecules in the material, or endangers heat-sensitive materials, also arises on account of the machining (mastication) of highly viscoelastic fluids. An increased temperature also reduces the viscosity of the mixed product, so that the high internal shear stresses required for dispersion are not achieved. The leading-away of the heat is neither adequate with a cooling of the nozzle block. The time-consuming removal of a mixture from the installation for the purpose of an intermediate cooling is also undesirable for economic reasons.

It is the object of the invention, to improve the device of the previously mentioned type with regard to processing technology, vis-à-vis the solution according to the document CH 542699, and thus to simplify the mixing method and to render it more economical.

BRIEF SUMMARY OF THE INVENTION

In the method according to the invention for mixing substances, a powder-like mixing component such as soot, filler or sulphur, is added in the form of a suspension to a substance to be treated, such as natural rubber, rubber or polyurethane, for example. The suspension fluid serves as a process fluid which prevents an agglutination under pressure, and by which means the component heated by the dissipation of heat is cooled. The supply of the mixing component and the removal of the process heat is preferably effected in steps.

The supply of heat is constantly computed by the process computer from the conversion of mechanical mixing energy into heat, just as the removed thermal energy from the condensate quantity of the evaporated process water and from the corresponding evaporation heat of water at the present temperature and the prevailing pressure. Thus for each substance or compound to be mixed, the thermal capacity values may be computed from the respective thermal balance by way of temperature measurements carried out regularly during the course of the process by way of a temperature probe. Once the thermal capacity is known for a certain mixture, the process temperature may be constantly computed from the thermal balance, and displayed, so that the temperature measurement may be done away with. A stepwise addition of components, as well as the removal of heat, permits an improved control of the process- and reaction heat.

A substance to be treated, for example a raw component or a premixture, is filled into a press cylinder. This press cylinder, given a closed device, is connected to a second press cylinder via a nozzle block. The raw component or the premixture is preferably pressed by way of the press piston, through at least one opening in the nozzle block, into the second press cylinder. The admixing of further components is effected as a suspension via a feed conduit to the one press cylinder, wherein the admixing may preferably be metered by way of the control of a valve.

The leading-away of process heat is effected by way of evaporation of the process heat under a vacuum, via a feed conduit to a press cylinder, and is likewise preferably controlled (with a closed loop) by way of a controllable valve. The leading-away of process heat may be effected after each passage of the substance to be treated, through the nozzle block. With this, one prevents the substance from being heated too much, and thereby the viscosity of the substance to be treated from moving into a region which is not very effective, and/or undesired chemical processes from being activated. The temperature, however, is kept high enough in order to ensure ideal flow characteristics (viscosity) and, thus, mixing characteristics. With the method for mixing raw rubber with soot, the temperature of the mixture is preferably kept below 100° C., typically around 70° C.

The method according to the invention for mixing substances is not only superior to common mixing methods on account of a direct and highly efficient cooling by way of evaporation over an as large as possible surface. This efficient cooling is, for example, in contrast to a cooling of an outer cylinder in the case of a mixing extruder or co-kneader, or a chamber wall and crank in the case of an inner mixer, in which the cooling is effected indirectly by way of leading the heat via the machine or its machine parts. The method according to the invention also ensures a homogenous temperature distribution in a mixture, which is present as random, loose debris in the form of thin extrudates. This is because a set nominal value of the vacuum limits the vapor pressure and thus the bandwidth of the vaporisation temperature, in particular also in such mixtures. Furthermore, the improvements by way of the method according to the invention permit a much more intensive mixing- or kneading procedure or a much larger energy input without intermediate cooling outside the device.

The mixture is cooled and simultaneously dried by way of leading away the process heat. The cooling is effected under a technical vacuum, wherein an additional vacuum pump may be connected to a press cylinder for this. The complete drying of the mixture may be effected in the same manner.

In a preferred embodiment, the device comprises several nozzle blocks which may be mutually exchanged without disassembly of the installation. The nozzle blocks are, for example, arranged on a sliding table which may be slid between the press cylinders. Furthermore, the nozzle blocks are designed differently, in that for example, they have a different number of openings, different opening diameters and/or different surface structures. Different surface shapes of the nozzle blocks may, in particular, reduce a pressure loss with a given material throughput, by way of them forming the narrowest, shear-stress intensive, mixing-inactive sections of a nozzle channel as short as possible. An exchange of nozzle blocks without disassembly of the installation increases the efficiency of the method, not only by saving work, but also by way of the fact that the mixing conditions prevailing in the press cylinders may be kept in a favourable region, in particular also kept constant. An exchange of the nozzle blocks in the course of a mixing procedure, without removal of the mixture from the machine, offers the further advantage that the machine conditions, for example by computer control, may be adapted continuously to a changing viscosity of the mixture and to the occurring different process sections. Thereby, an adaptation to different process sections, such as mastication, admixing, homogenisation and final extrusion, is possible at essentially equal piston speeds and/or operating pressures. The use of special nozzle blocks furthermore permits a profile extrusion, i.e. a discharge of the finished mixture in the desired shape, e.g. as a material in webs, in a film-like manner, in a bag-like manner, etc.

Preferably, for the method for mixing, one selects nozzle blocks or those nozzle blocks are inserted between the press cylinders, in which the openings in the blocks are matched to the nozzle block cross section, the pressing force of the mixing piston and the momentary viscosity of the material to be treated, and result in an optimal throughput. For example, for highly viscoelastic fluids with a viscosity of $<10^7$ Pas, for example raw rubber, a narrowing ratio of 4 from the cylinder cross section to the cross section of all openings in the nozzle block is selected. With a constant number of openings, the narrowing ratio is approx. 100 for fluids of $<10^5$ Pas. Such fine nozzle blocks are very suitable for mixing powder suspended in fluid, into a highly viscoelastic matrix.

The mixing-in of solid mixing components as a suspension, apart from advantages with regard to heating- and cooling technology, also offers the possibility of admixing pressure-sensitive components, such as soot or chalk for example. These tend to briquet, which may be largely prevented by the fluid surrounding these components.

In a preferred embodiment, the solid mixing component which is typically powder-like, is pre-treated, in order to reduce the grain diameter. This, depending on the characteristics of the suspended component, may be effected by known methods as in a spherical bed, a dispersion roller, in an edge mill or likewise. A finer distribution (homogenisation, striation thickness S) of the solid component in the matrix is possible by way of this, even with only very few passages, e.g. 2, 3 or 4 of the mixture through a nozzle block.

In order, as much as possible, to be able to let the mixture parts receive the same treatment, the mixing chambers should be completely emptied at the end of each working cycle. This permits the residue-free emptying of the machine after completed extrusion. Such a complete emptying is effected preferably by way of a corresponding, preferably meshing form of the nozzle surface and the press piston surface. A very narrow sojourn time spectrum with regard to mixing technology arises with this.

The method may also be designed in a friendlier manner also with regard to material saving and in particular with regard to the cleaning of the device, by way of the press surface of at least one press piston having shapes corresponding to the opening or openings of the nozzle block or its surface. By way of this, essentially the complete contents may be transferred from one into the other press cylinder by way of displacing the press cylinder. The cleaning of the one press cylinder, and as the case may be, of the nozzle block, becomes superfluous by way of this. A nozzle block may also be provided with such structures on both sides.

In the methods common today, solid mixture components with an average grain size of at least 100 μm are used, and a distribution of S≈0.1 mm is achieved. Each fine distribution S<0.01 mm entails a rolling mill arranged downstream. Thereby, as a result of the usual average granulation of the powder-like or paste-like fillers by 0.01 mm, any distribution quality reaching below this average value would be meaningless; i.e. in any case, the granulation must be previously refined by way of a separate process, e.g. by the supplier of the materials Distributions of S<0.1 mm, preferably S≦100 nm, for example 40-80 nm are possible with similar or shorter mixing durations with the device and the method for mixing, according to the invention. For this, the solid mixture component is preferably pre-treated, so that the average grain size is less that 100 μm, preferably less than 1 μm, for example about 80 nm or 100 nm. Such fine distributions may not be achieved in a hydraulic manner with applied grain sizes of ≧100 μm during the mixing.

The complete device is preferably controlled by computer, so that all method steps of the mixing process, including extrusion of the finished material in a desired shape (profile extrusion), may be implemented in a completely automatic manner. The device, thus, not only offers the advantage of uniting all steps of a mixing process, including mastication and profile extrusion into a single device, but with a completely automatic control, also yet provides the possibility of the complete treatment method being able to be carried out by one person. It is only possible to combine all method steps which occur with an internal mixing process, into a single installation due to the installation of suitable exchange nozzles, and an efficient cooling. In particular, the mastication and the extrusion of the finished mixture in the desired shape (profile extrusion) were processes which until now were carried out on separate devices.

The computer control of the device also permits a control with reference to a data bank. Several method-, device- and material parameters for the most varied of raw materials and mixture components are stored in this, which one may fall back on. Furthermore, an optimised method procedure may be stored and be repeated with a high reproduction rate, since all process steps take their course essentially "internally", and no external method steps are present on different devices.

The interaction of the mixing energy dissipation, cooling by way of vacuum evaporation and efficient thermal passage by extrusion, may also be applied comprehensively in chemical reaction technology. For example, exothermic reaction instabilities may be stabilised by way of additional convective cooling in the nozzle block, by way of additional stepwise mixing-in of a neutral cooling fluid, but also by way of expulsion of the mixture into a separate cooling chamber, preferably downwards into a cooling bed, e.g. into a fluid or spherical bed. The mixture may be cooled in a shocked manner in a cooling chamber by way of the convective removal of heat. The stepwise supply of components furthermore permits a control of the reaction heat. A shifting of the boiling point of a substance or of a mixture in which the substance is subjected to a different pressure, in particular a vacuum, e.g. 0.5 mbar-1 bar, has particularly proven its worth. A reaction may be delayed or accelerated by way of this. A reaction at exactly a desired step in the mixing method may be triggered with this. Often, a homogenisation step is desired, which however should not trigger any further reaction processes apart from a homogenisation. However the temperature of the substance increases by a few degrees on passage through a nozzle block, which is undesirable depending on the material. Now, in a last but one step, by way of an applied vacuum, one may achieve a reduction of the temperature which corresponds preferably exactly to the temperature increase which results with a subsequent passage through a nozzle block. The finished processed substance, thus, has the desired temperature and homogeneity without a loss in quality. The mixing- or reaction process also has the generally known advantage that one may prevent or reduce a bubble formation in a material to be mixed. For example, an oxidation or nitration of a substance may be reduced by way of an applied vacuum.

In particular, mixing reactors and methods in which a continuous discharge of a product is possible, are desired in industry.

For this, at least one, preferably several mixers and an extrusion press, hereinafter also called units or modules, are arranged next to one another in a modular manner, and connected to one another via a transfer vehicle. A substance is transferred from a filling position via one or more mixing positions, to the extrusion press by way of the transport vehicle and transfer containers in the preferred form of cylinders. Preferably, the mixer or mixers are the devices for mixing according to the method. However, they may also be very simply designed mixers, in which one only masticates and/or homogenises, without the addition of components.

A transfer cylinder is preferably only displaced between two positions: in one position it is filled, then transferred into another position in which it is emptied, then transferred back into the one position, there is filled again, etc. Suitable mixing- and/or reaction processes take place between these. If the position is a filling position, then raw material which may be an individual substance but also already a mixture, is filled into a transfer container. If the other position is a last position, then a finished mixture is transferred into an extrusion press, and from there is discharged or extruded. If it is neither the case of a first nor a last position, then substances or mixtures in unequal process stages are transferred from one to a next mixer for further processing. It is of course also possible to operate a mixing reactor, in which all transfer containers run through all stations, i.e. at least on processing a material, to transfer only in one direction. If units of the mixing reactor are rowed next to one another in a line, then a continuous discharge is limited essentially to the total filling quantity of all transfer containers. The transfer containers, after running through all stations, may then be transferred back again into their original position in a manner such that a first transfer container is in a filling position. If the units are, for example, arranged in a circular manner, then a continuous discharge is possible also on transfer of the transfer containers in exclusively one direction. A further advantage of the embodiment in which the transfer containers are only transferred to and fro between only two positions, is that surfaces of press pistons which are preferably tailored to the design of the nozzle block, only need to be tailored to maximally two such surfaces. Since the individual nozzle blocks may differ greatly with several, e.g. three or four mixers, corresponding press piston surfaces and nozzle blocks over a complete spectrum is rather difficult to accomplish or not possible at all. Also, if desired, inner surfaces of transfer containers may be configured to the respective mixtures or to processes taking their course in the two special mixers.

The individual mixers may be designed differently; in particular they may comprise different nozzle blocks, so that different mixing- and reaction procedures take place in the individual mixers. It is however also possible to equip two or more adjacent mixers identically or at least with the same nozzle blocks. With this, and with the arrangement of several mixers after one another, a standardisation of the installation to more economical and more rapidly available standard replacement parts is possible, without having to reduce the quantity of the substance to be processed. The installation is also much more flexible with regard to how much, how and what is to be treated. If the individual units of the mixing reactor may be set in an individual manner, then a mixer may be set in a targeted manner to the reaction- and/or mixing process which takes place in it. The mixers may, thus, be set to a substance to be treated in each process stage, or as the case may be, also be able to be exchanged individually, e.g. for cleaning, repair or for adapting the mixing reactor to a different mixing process, which requires a particular mixer. Typical process parameters are the mixing or piston pressure, the mixing temperature, the mixing speed, etc. It is for example also possible by way of the individual design, to switch from one raw material to be treated, to another one, without essentially having to interrupt the process. As the case may be, a cleaning substance may run through the whole process, i.e. all units of the mixing reactor, in order to clean the installation from the residues of the previous substance. The device and the method for mixing, the mixing reactor and the method for the continuous discharge are described hereinafter in more detail by way of exemplary method steps and embodiments.

BRIEF DESCRIPTION OF THE DRAWINGS

There are shown in:
FIG. 1 the device in the open condition,
FIG. 2 the device after introducing the mixing components,
FIG. 3 the device on vaporisation of process water,
FIG. 4 the device on profile extrusion,
FIG. 5a, 5b a longitudinal section through a structured nozzle block between two press cylinders, and a plan view of the nozzle block according to FIG. 5a,
FIG. 6 a mixing reactor in a filling-in position,
FIG. 7 the mixing reactor according to FIG. 6, during the filling of an extrusion cylinder,
FIG. 8 a total view of the mixing reactor.

DETAILED DESCRIPTION OF THE INVENTION

Figure 1:
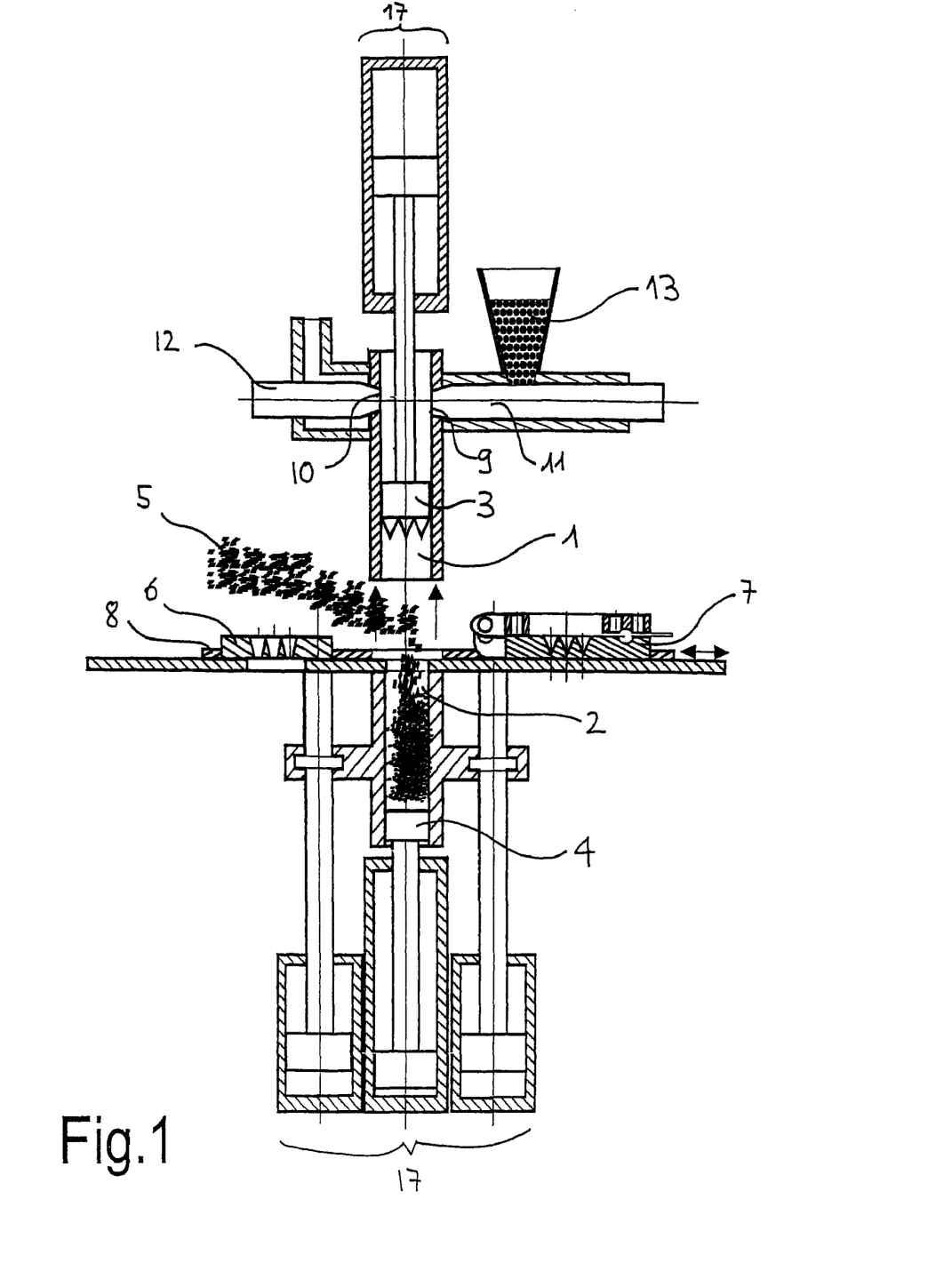

The device is represented opened in FIG. 1, with a partly retracted upper press piston 3 in a lower upper press cylinder 1, and a retracted lower press piston 4 in a lower press cylinder 2. The press cylinders are cylindrical or tubular, and arranged in a coaxial manner and have the same diameter. A raw material 5 or a premixture is filled into the lower press cylinder 2. In order to release the lower press cylinder 2, the nozzle blocks 6, 7 on the sliding table 8 are arranged displaced laterally from the axis of the press cylinder. After filling the raw material 5, a nozzle block 6 is arranged between the press cylinders, and is pressed tightly onto the upper press cylinder 1 with the help of a piston arrangement 17. The raw material for mastication is pressed through the openings of the nozzle block with the lower and upper press cylinders 3, 4. This is effected until the raw material, hereinafter called matrix, has achieved a desired temperature. With raw rubber, this is a temperature of approx. 60° C.-70° C., and for this requires about four nozzle block passages. Subsequently, a mixing component in the form of a suspension 13, e.g. soot and water, preferably in a portioned manner, is added to the matrix 5. For this, the upper press cylinder 1 has a first opening 9 which may be closed by a bar 11 or a valve. This first opening 9 is connected to a container which contains a suspension 13. Any pre-treatment of the suspension, e.g. in the spherical bed, may be effected in this container itself, but also in a treatment step which is arranged upstream of the filling of the suspension into the container.

In order to optimise the mixing method, the matrix is completely pressed into the lower press cylinder before the addition of mixing components. Thereby, a structured surface of the upper press cylinder, said surface corresponding to the (surface) structure of the nozzle block, is helpful. With this, the press piston is not only pushed onto the nozzle block, but essentially into the nozzle block. Free spaces between the press cylinder and the nozzle block are prevented or at least minimised by way of this.

Figure 2:
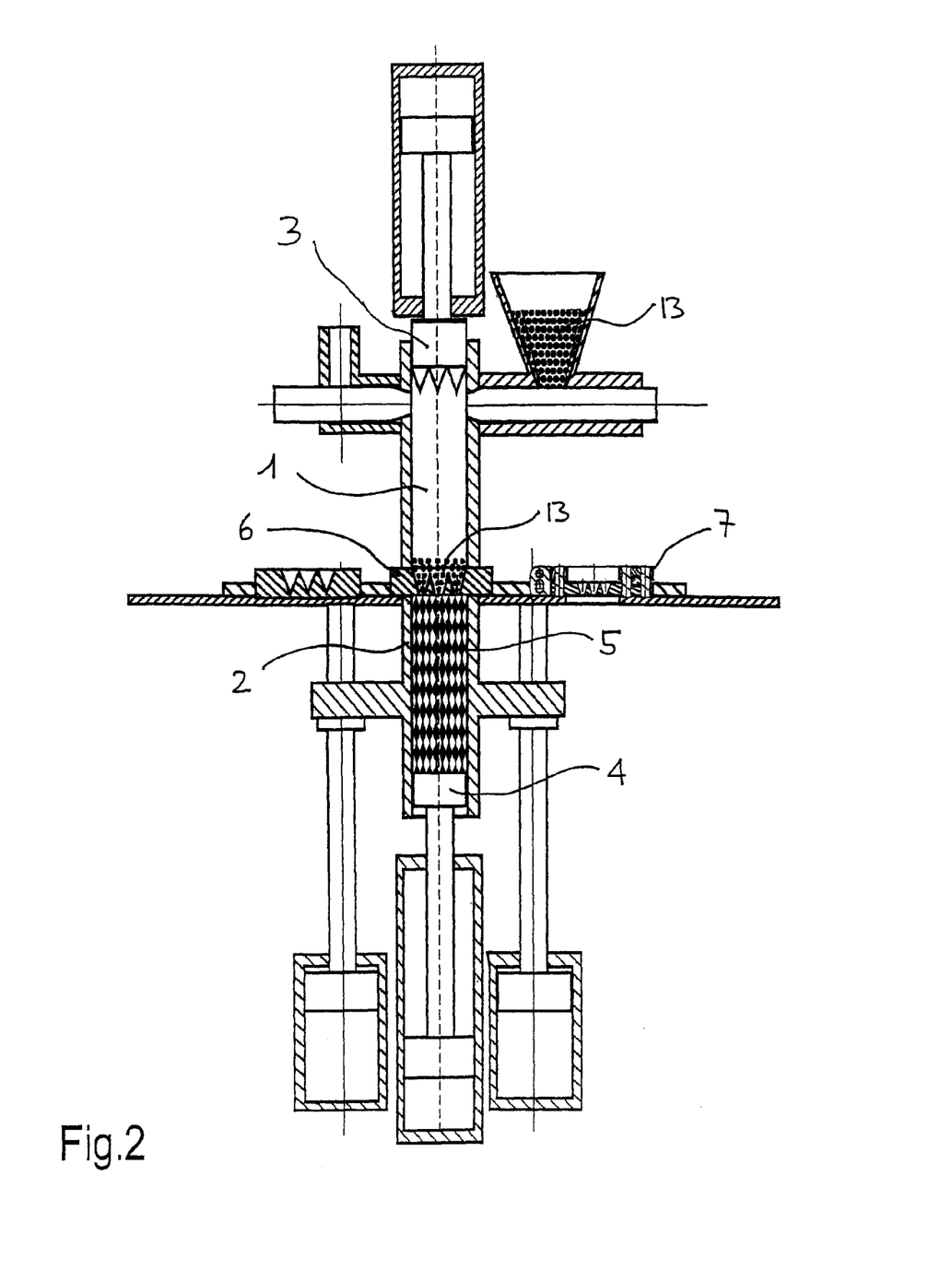

As is shown in FIG. 2, given a completely retracted upper press piston 3 and given a retracted bar 11, the suspension is transferred to the structured nozzle block. The use of a bar as a valve permits a complete transfer of the suspension into the press cylinder without residues in the feed conduits.

Figure 3:
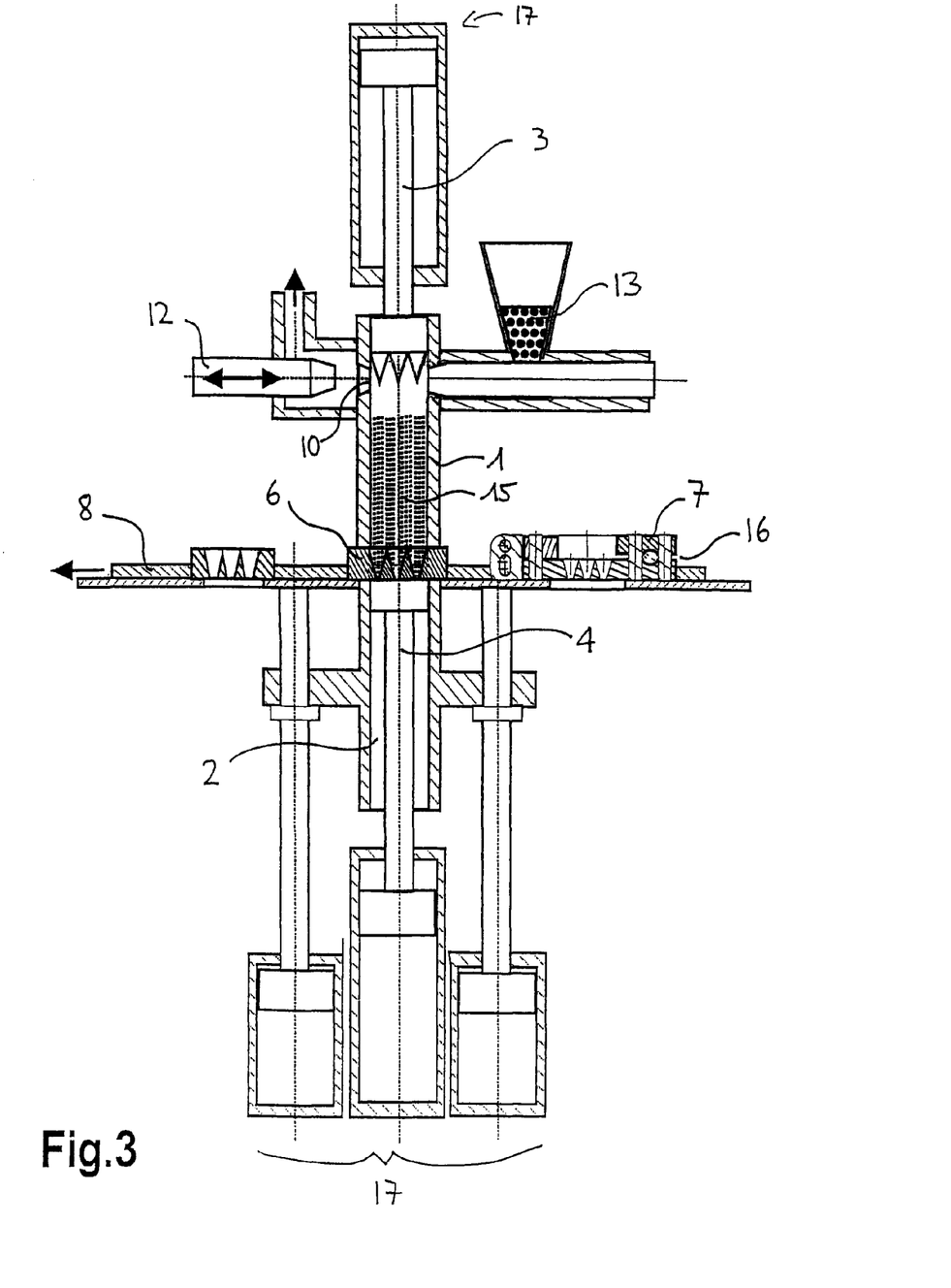

The nozzle block with several openings has the effect that the masticated matrix pressed through, as shown in FIG. 3, forms several strands 15 to which the suspension may adhere. Even already with the first passage, a very great mixing of matrix and mixing component is achieved by way of this very large surface, in that the smallest of suspension droplets of the suspension fluid are distributed in the mixture. With this, the fluid of the suspension, so-called process water may also evaporated from a large surface. Each passage of the mixture through the nozzle block affects an increase in temperature of approx. 10° C. and an increase of the operating pressure in the mixing chamber. In order to prevent a further increase in temperature, process heat is led away by way of evaporating the fluid of the suspension. For this, the upper press cylinder has a second opening 10 which again may be closed by a bar 12 or a valve.

In FIG. 3, the upper press cylinder 3 is completely retracted, and the discharge valve is opened, so that process water may escape through the second opening 10. Preferably, process water is evaporated under controlled conditions, or under a technical vacuum at approx. 50 mbar. For this, a vacuum pump may be connected in the region of the discharge opening. A continuous discharge of dispersed mixing energy (thermal dissipation) is achieved by way of a stepwise evaporation of the wet component of the dispersed phase amid a technical vacuum. Thereby, the cooling sequences may be kept relatively short, since the extruded mixture threads 15 with a preferred diameter of 0.5-1.5 mm, e.g. 0.8 mm or 1 mm, have a steep temperature gradient and a very large surface of example 200-times the cylinder inner surface. Very high mixing pressures of up to 400 bar may be also achieved by the high evaporation. It is possible to maintain the mixing temperature typically below 120° C., preferably below 90° C., e.g. at 70-80° C., so that the mixing process does not need to be interrupted. This would not be possible with conventional devices, in which one cools by way of the cylinder surface or the nozzle block walls, and temperatures of up to 180° C. are reached. With such high temperatures, as a rule chemical processes are triggered, such as for example the cross-linking of polymeric components which with mastication and the mixing of mixture components into a raw material, as a rule are not desirable.

Figure 4:
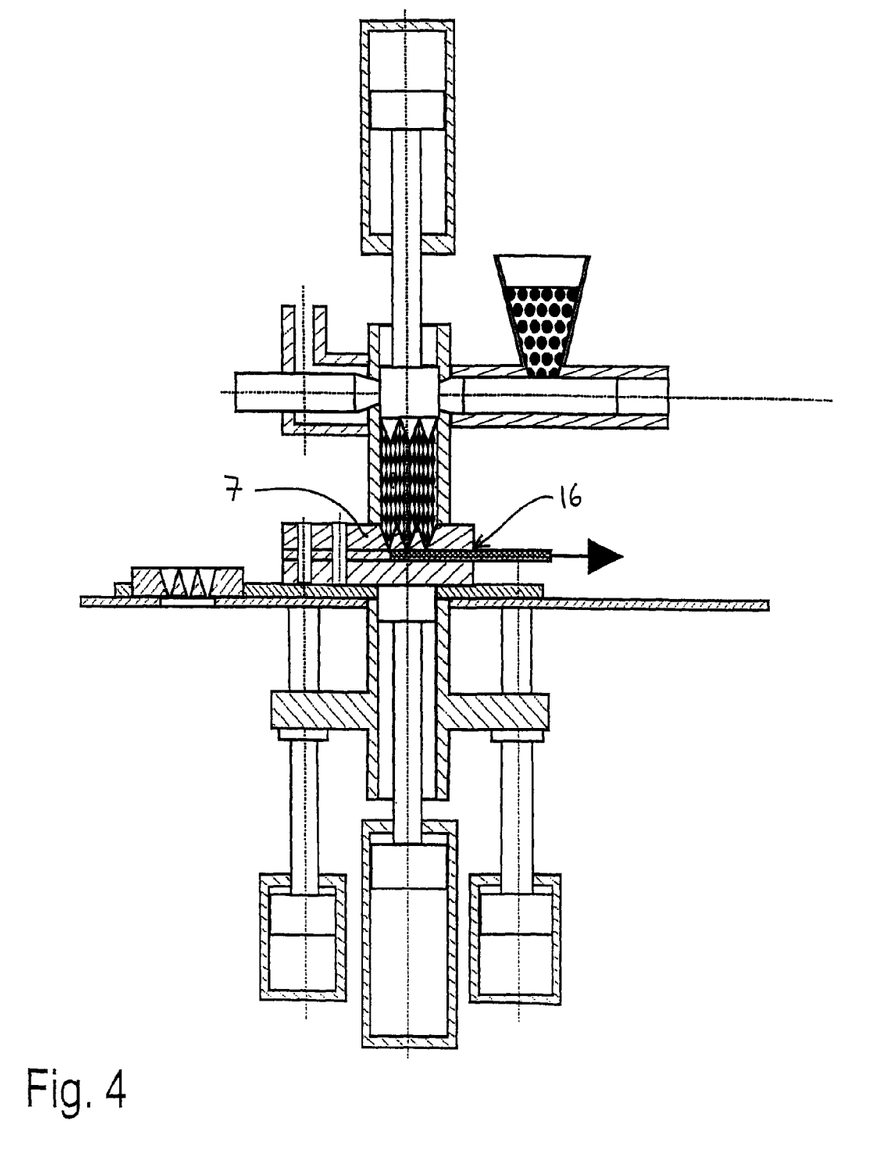

If the evaporated water is condensed and measured, one may then determine the residual water content of the mixture with this, and the course of the mixing method may be observed, controlled and as the case may be, regulated. After the mixture is dried completely or to the desired extent after several mixing cycles, the nozzle block 6 may be replaced by a special nozzle block 7 arranged on the sliding table 8. The device is shown with the inserted special nozzle block for manufacturing film-like materials in FIG. 4. The special nozzle block 7, on account of its design, permits a discharge of the finished mixture in the arrow direction out of an opening 16, in a desired shape (profile extrusion). If the discharged material is film-like, the mixing device may be supplemented with an additional device for smoothing the film material, e.g. a roller.

The piston arrangement 17 shown in FIGS. 1 to 4 serves for the hydraulic drive of the press piston 3, 4 in the press cylinders 1, 2 as well as for an optimised force transmission on opening and closing the whole device. The press pistons are moved by way of double-acting drive cylinders arranged coaxially outside the nozzle cylinder. The press cylinders may be coaxially displaced to one another, such that the mixing chambers may be selectively opened, for example to add in raw materials, or in order to seal the chambers A similar piston arrangement has already been described in CH 542699 and is not to be described in more detail here.

Figures 5A, 5B:
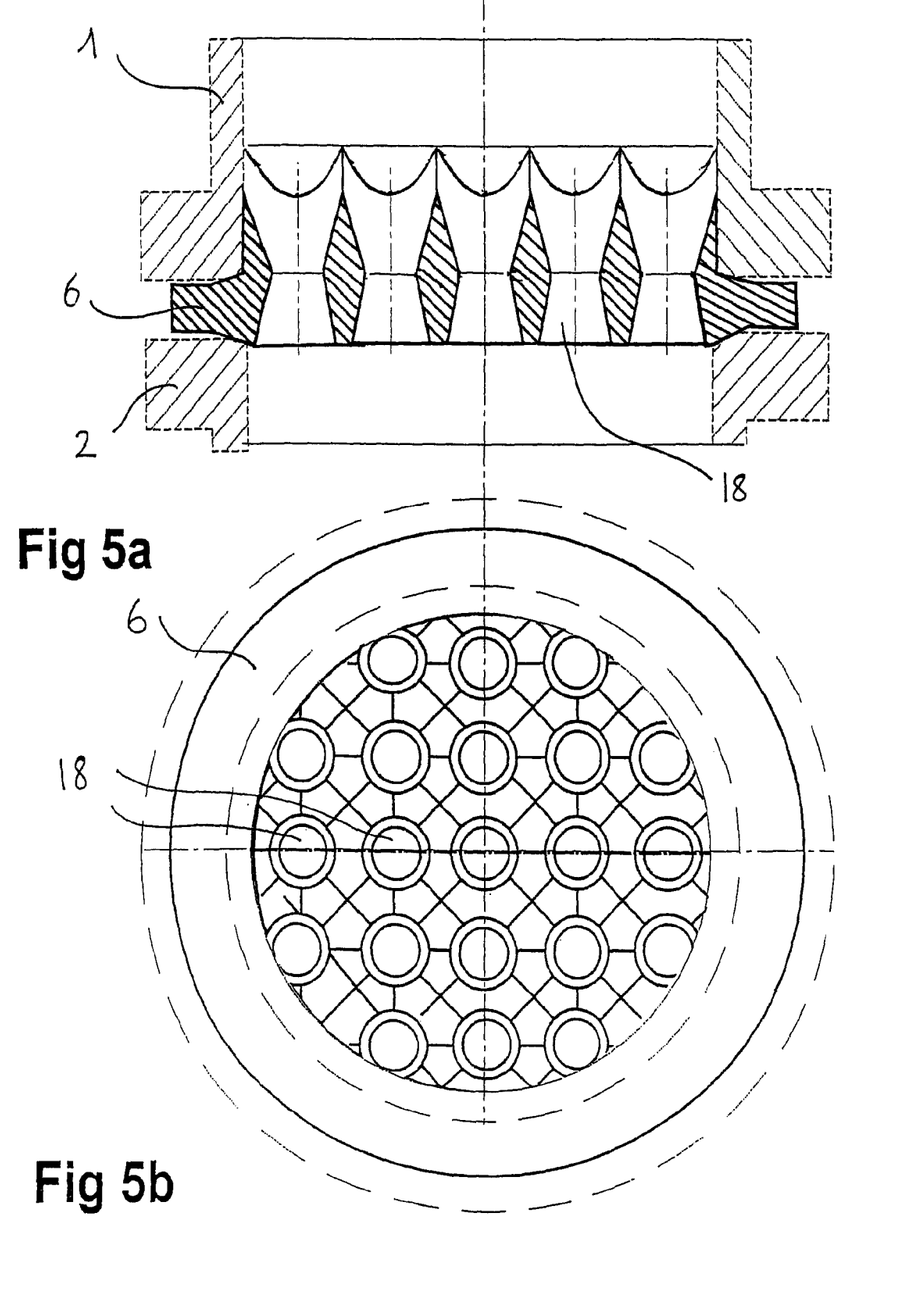

FIG. 5 shows a section through a structured nozzle block 6, wherein a part of the upper and lower press cylinder 1, 2 is still represented. This nozzle block represents a "fine" nozzle block, as is for example used for mixing powder suspended in a fluid, into a highly viscoelastic matrix, e.g. soot in water into rubber. The nozzle block 6 comprises 21 openings 18, through which the material is pressed. The openings, for example, have a diameter of approx. 0.8 mm with a nozzle block diameter of 160 mm. The regions 19 between the openings 18 are shaped tapering upwards in a pointed manner, and have inwardly curved sides, in a manner such that cone-like counter-pieces may be introduced from above into the openings 18 in an essentially precisely fitting manner. The pressing surface of the upper press piston 3 is preferably provided with cone-like projecting formations corresponding to the openings 18 or the surface of the nozzle block. With such a structured upper surface of the nozzle block, there are no surfaces on which material could accumulate. This surface permits a simplified "flowing-away" of material, and a simultaneous guiding of structures of the press cylinder.

The structures of the nozzle block essentially permit a simplified transfer of mixed product from a first into a second pressure chamber, and may have the most varied of shapes. The structure shown in FIG. 5 at the upper surface, in a modified shape, is also designed on the lower surface of the nozzle block. In this case, the press surface of the lower press piston is also structured in a corresponding manner. For the additional thermal regulation, it is also possible to provide a lateral supply for cooling- or heating means in the nozzle block (not shown in the Figure).

By way of the use of nozzle blocks provided with openings, i.e. the conversion of the flow procedure from shearing to striation, one may, for example, achieve distributions (striation thickness) with a constant tensile force of <50 nm. In the "finest" nozzle block of 21 openings with 0.8 mm shown by way of example, a mixture needs to be pressed through the opening only three times for this. The mixing effect is supported merely by the so-called melt fractures, which with certain operating conditions (instable through-put conditions) are caused by the passage of the mixture through an opening.

Figure 6:
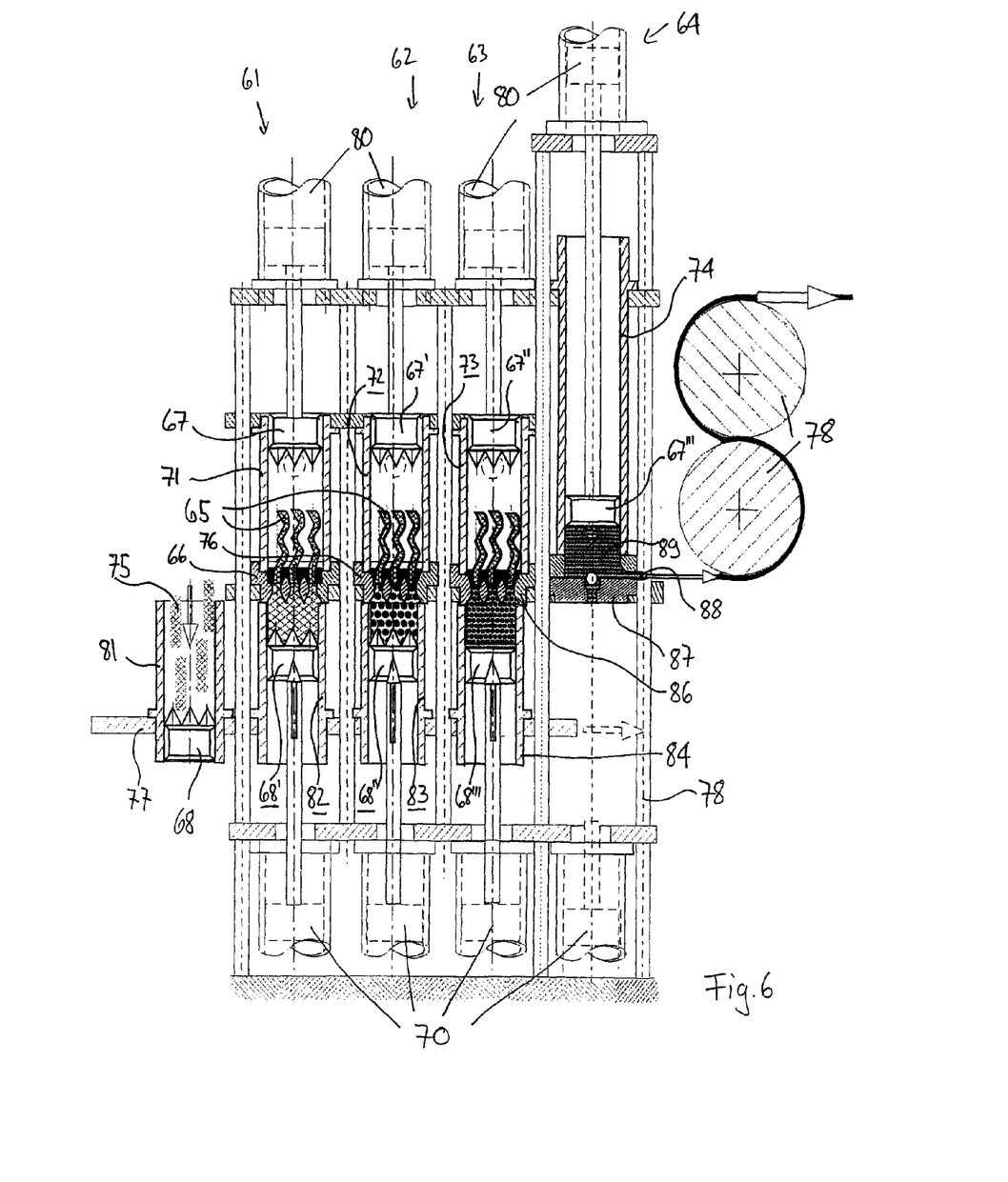

FIG. 6 shows a mixing reactor with three mixers 61, 62, 63 arranged next to one another, and an extruding press 64 connecting thereto. The mixers are connected to one another via a transfer vehicle 77 (only shown in a sectioned manner). The mixers and the extruding press are assembled in the machine frame 78 in a fixed, but preferably exchangeable manner, with the exception of the lower transfer cylinder 81, 82, 83 84. This also applies to the nozzle blocks 66, 76, 86 in the mixers and the special nozzle block 87 of the extruding press.

The mixing reactor is shown in a position in which all mixers are filled, and a finished mixture 89 is extruded or discharged. Thereby, the first transfer cylinder 81 is located in a filling position and is filled with a raw material 75. During this, in each case differently treated raw material or mixtures are mixed in the three mixers, until the finished mixture 89 which is discharged from an extrusion opening 88 in the extrusion press in a desired shape. The extrusion opening is located in a special nozzle block 87 and is for example configured as a strip extrusion nozzle, wherein the extruded tape is subsequently led over a roller-, smoothing and/or trimming device 78. Such a method arranged downstream may also permit the complete curing of the extruded material, for example of a duroplastic which was still in a plastically deformable condition until the extrusion.

The mixing is effected in the individual mixers in a manner known per se, in that the material is pressed to and fro through openings in the nozzle blocks 66, 76, 86 between the transfer cylinders and the upper mixing cylinders, with the help of lower and upper press pistons 68, 68', 68'', 68''', 67, 67', 67'', 67'''. The mixture threads 65 which are extruded through the respective nozzle blocks 65, in the mixing cylinders, may in turn be mixed with further materials, cooled, heated or treated in another manner.

Figure 7:
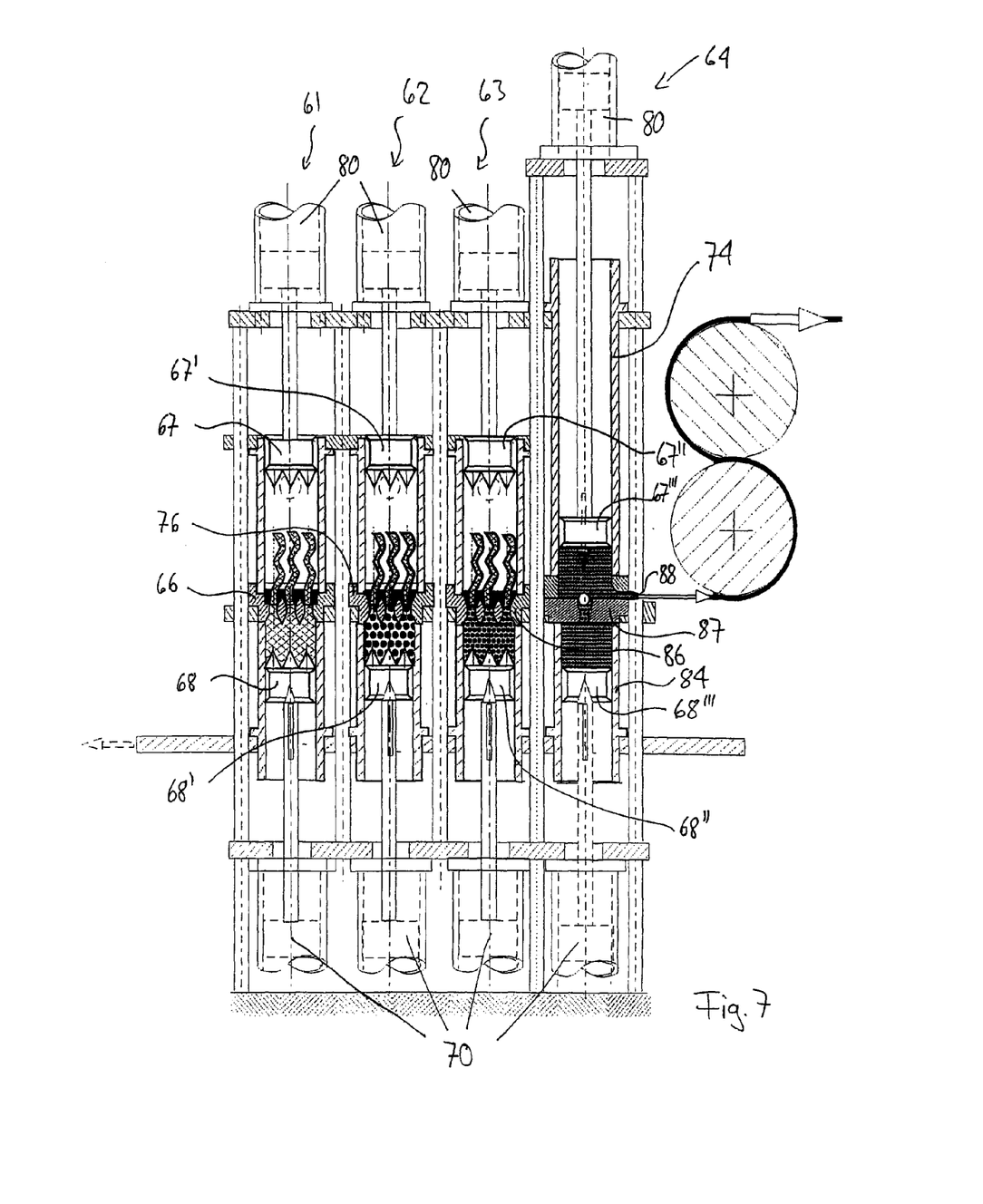

If the filling- and mixing process in the individual mixers have been completed, then all the lower press cylinders are pushed downwards, and the mixtures present in the mixers are pressed as completely as possible into the transfer cylinder with the help of the upper press cylinder. Subsequently, the transfer cylinders are transported further in the direction of the arrow in the Figure to the right by one position further, with the help of the transfer vehicle. The mixing reactor is now located in a position as is shown in FIG. 7. The raw material which has just been filled in, is now located in the first mixer 61, and the previous mixtures in a mixer x+1, wherein x is that mixer in which the mixture was previously located (here 1→2, and 2→3). It is for example possible to introduce a component to be admixed, into a mixing cylinder already during the transfer. Preferably, a mixing cylinder for this comprises a separate opening, preferably additionally to an opening for a vacuum. Then the material is mixed with the added component already with the first high-pressing of the material through a nozzle block.

The finished mixture which has been transferred with the fourth and last transfer cylinder 84 from the third mixer 63 to the extrusion press, is now pressed with the press piston 68''' belonging to the last transfer cylinder, through a special nozzle block 87 into the extrusion cylinder 74. The special nozzle block comprises essentially only one opening as a passage between the cylinders, preferably in the form of a one-way or return valve. The finished mixture may be pressed from below to the top into the extrusion cylinder, but may no longer flow back into the last transfer cylinder. The valve may for example be a simple ball, which is pressed downwards on account of the weight force of the mass located in the extrusion cylinder, and/or on account of an impinged extrusion pressure, and by way of this closes the opening in the special nozzle block, which for this purpose is designed with an unequal diameter, e.g. in a conical manner. Such a return valve may also be designed in a different manner, and e.g. be operated pneumatically or magnetically.

The special nozzle block comprises an extrusion opening 88 which here is a lateral recess in a special nozzle block divided into two.

Once the complete finished mixture has been transferred into the extrusion cylinder and the mixtures in the three mixtures partly or fully treated, then the material located in the mixers is pressed into the upper mixer and the empty transfer cylinders are displaced to the left by one position in the direction of the arrow. Whilst the first transfer cylinder is now again in the filling position and may be filled, the mixtures may be ready mixed in the mixers, if this has not yet been effected.

The masses located in the mixing containers as a rule are so viscous or firm, that no material may exit downwards through the openings into the nozzles on account of gravity. If however, relatively fluid materials are treated in the mixers, then one may also attach apertures or runout devices at the bottom in the region of the nozzle blocks.

Preferably, a lower part of the special nozzle block, or the whole block, as well as also the other nozzle blocks, may be lowered for inspection or for exchanging the nozzles. The three nozzle blocks for this are preferably introduced in a common plate. An as complete as possible emptying of the transfer- and extrusion cylinder, as well as of the special nozzle block also simplifies an exchange from one mixture type to the other. This also applies to an exchangeable special nozzle block, which is made possible by way of the special arrangement of the mixing reactor with a separate extrusion press. An exchange, for example, of a material which preferably required a strip extrusion nozzle, may be replaced in a simple manner and without mixing the different mixture types, by a material which is preferably extruded as a granulate. The materials of the mixers are adapted to the materials to be mixed, for example of hard steel, which withstands correspondingly high pressures, in particular also pressing pressures of the cylinders against one another or against a nozzle block, as well as of suitably corrosion-resistant material, for example if fluorinated plastics are processed.

The volume of the extrusion cylinder serves as a compensation storer, in that a finished mixture may be intermediately stored, so that a continuous extrusion is possible.

The surface of the first three lower and upper press pistons 68, 68', 68'', 67, 67', 67'' comprises a structured surface, in a manner such that they correspond to the respective openings in the nozzle blocks 66, 76, 86 of the mixers. This permits an as complete as possible transfer of the mixtures from one into the other cylinder, and also an as complete as possible emptying before a new mixture gets into a mixer. This is a further step which provides for a good quality of the finished product and its manufacturing control.

The surface of the last lower and upper press piston 68''', 67''' for this purpose is designed as plane as possible, in order to bear in an accurately as possible fitting manner on the flat upper side and lower side of the special nozzle block, and not to compromise the return valve.

The mixing reactor furthermore comprises drive cylinders 70, 80 which are preferably installed in the machine frame in a fixed manner, and with which the press pistons are driven. The machine frame 78 preferably comprises free spaces below the transfer cylinder and above the mixing cylinder. These free spaces permit an inspection of the press piston when these are completely retracted.

The press pistons are in each case allocated to a transfer cylinder and close this to the bottom, i.e. form the base of the transfer cylinder. In order to permit a transfer of the cylinders, the press pistons are arranged such that they may be separated from a drive rod of the drive cylinder. Means may be present for this in the press piston, where a drive rod may engage.

The mixer and the extrusion press may preferably be set with individual mixing- or reaction parameters and thus be able to be adapted to different materials to be mixed. For example, it is sufficient to impinge an almost fluid material, e.g. a high-melting thermoplastic mixture with a few atmospheres of pressing pressure by the press piston, in the mixer. A viscous material such as rubber for example, requires considerably higher pressures, for example up to 400 bar. The individual setting of the individual mixers including the extrusion press with extrusion nozzle thus not only with regard to the material to be pressed permits exactly set processing parameters of the raw material up to the finished product, but also the setting of the mixing reactor to very different materials which are also to be processed differently.

Figure 8:
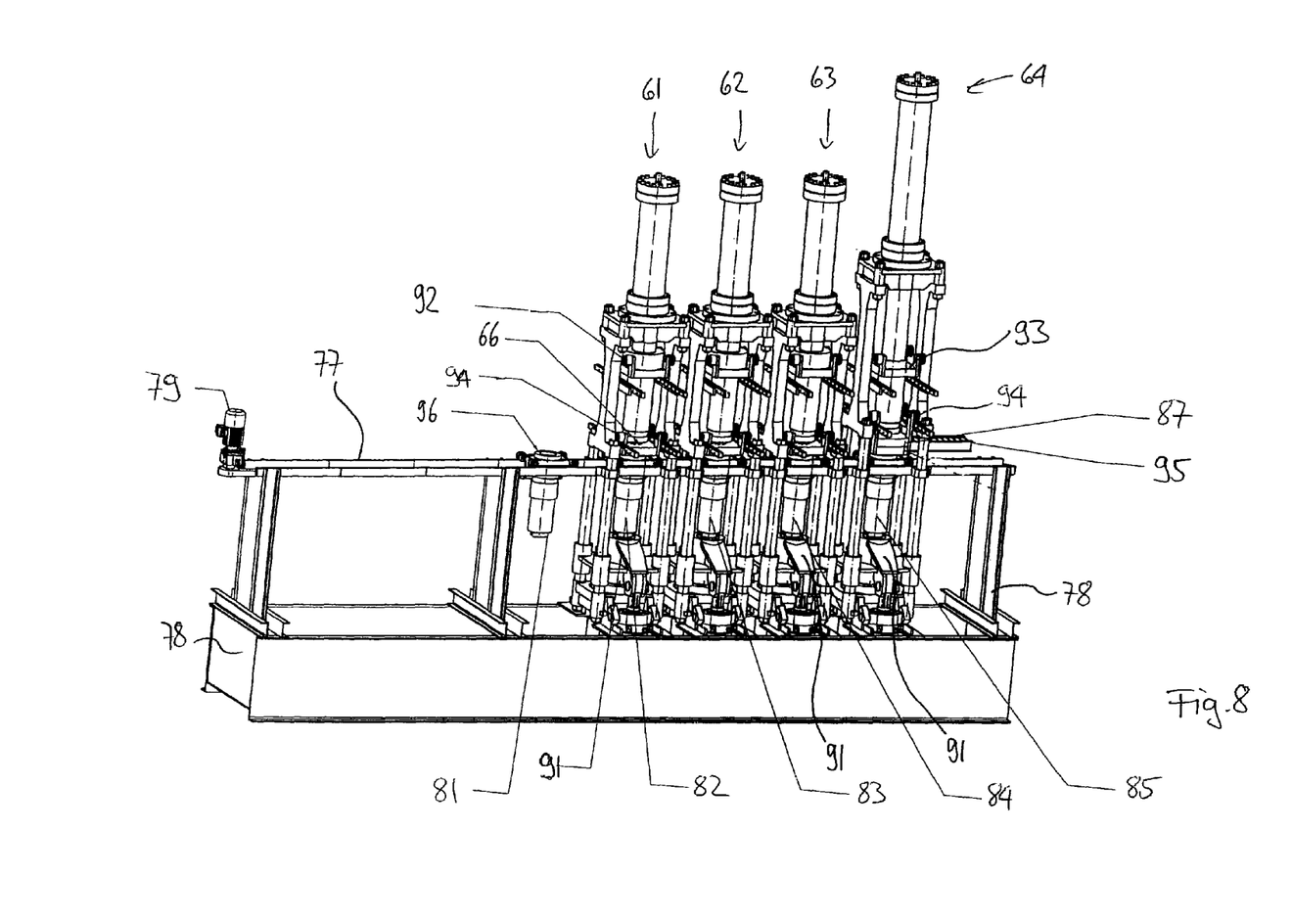

A total view of the mixing reactor according to the FIGS. 6 and 7 is shown in FIG. 8. One may see the units of the mixing reactor, three mixers 61, 62, 63 and an extrusion press 64 which are fastened in a machine frame 78 and are arranged in a modular manner next to one another, preferably at the same distance to one another. Drive cylinders, mixing cylinders- and extrusion cylinders, as well as nozzle blocks are assembled in the frame in a stationary manner. The mixing- and extrusion cylinders, as well as nozzle blocks may be horizontally extended out of a vertical mixer- or extrusion press axis on rails which are attached accordingly in the machine frame, by way of mixing cylinder vehicles 92, extruding cylinder vehicles 93 and nozzle vehicles 94. This serves for a simplified control, repair, and replacement etc. of the respective parts.

The units are connected to one another via the transfer vehicle 77, wherein the transfer cylinders may be transferred on the rail-like transfer vehicles with a transfer drive 76. For demonstration purposes, transfer cylinders are represented in the Figure in each position of the mixing reactor. As a rule however, only as many transfer cylinders as units are present. The transfer cylinders are preferably pressed against the nozzle blocks in a resilient manner by way of adjustment yokes 91 which are located in the positions of the mixer and the extrusion press. Pressures to about 1000 bar are thereby quite common, in order to prevent the material from laterally breaking out of the mixers.

A first transfer cylinder 81 is located in a filling position 96, whilst further transfer cylinders 82, 83, 84, 85 are in each case allocated to the three mixers and the extrusion press. An exit 95 in the form of a tape provided with rollers, on which an extruded product may be transported to a next station, is located next to the special nozzle block 87.

In a preferred embodiment of the mixing reactor, one masticates in a first mixer, components are admixed in the second mixer, and homogenised in the third mixer.

The invention claimed is:

1. A mixing reactor for mixing and continuous extrusion of a substance, comprising:
    at least one mixer,
    an extrusion press,
    a transfer cylinder, and
    a transfer vehicle for transferring the transfer cylinder,
    wherein the at least one mixer and the extrusion press are connected to one another by the transfer vehicle, and
    wherein the substance to be treated may be transferred in the transfer cylinder from a filling-in position to at least one mixer, and to the subsequent extrusion press by means of the transfer vehicle, so that a finished mixture may be discharged from the extrusion press as a continuous product.

2. A mixing reactor according to claim 1, wherein the mixing reactor contains a plurality of transfer cylinders and a plurality of mixers, and each mixer comprises a lower, transferable cylinder which corresponds to a transfer cylinder and an upper, stationary mixing cylinder.

3. A mixing reactor according to claim 2, wherein a press piston which forms a bottom of the transfer cylinder, even during a transfer, is allocated to each transfer cylinder.

4. A mixing reactor according to claim 2, wherein the mixing reactor contains a computer control for individually setting mixing parameters, in particular mixing pressure, mixing temperature and mixing speed of each mixer.

5. A mixing reactor according to claim 2, wherein each transfer cylinder is equally distanced from an adjacent transfer cylinder.

6. A mixing reactor according to claim 1, wherein the at least one mixer is a device for mixing substances, the device comprising two tubular press cylinders, wherein a first tubular press cylinder is a transfer cylinder and a second press cylinder is a stationary cylinder, further comprising a nozzle block arranged between the press cylinders, wherein the nozzle block comprises at least one opening, in order to permit a passage of a substance to be treated, from one press cylinder into the other press cylinder, and wherein displaceable press pistons are present in the press cylinders, further comprising a closable opening for supplying a solid mixture constituent, and means for supplying a process fluid to one of the two press cylinders, as well as a second closable opening for the controlled evaporation of the process fluid, in a manner such that during the mixing process, the solid mixture constituents and process fluid may be supplied simultaneously to the substance to be treated, and process fluid may be led away in steps.

7. A method for the continuous discharge of a substance to be treated, with a mixing reactor according to claim 1, wherein the mixing reactor comprises a plurality of transfer cylinders and a plurality of mixers, and each mixer comprises a lower, transferable cylinder which corresponds to a transfer cylinder and an upper, stationary mixing cylinder, comprising the steps of:
    filling a substance to be treated into a frontmost, first transfer cylinder and
    transferring the first transfer cylinder, using the transfer vehicle, to a first mixing position, whilst simultaneously displacing further transfer cylinders to a further mixing position, and/or in the case of a last transfer cylinder, into an extrusion position.

8. A method according to claim 7, additionally comprising the following steps:
    a) filling a substance to be treated into a frontmost, first transfer cylinder,
    b) displacing all transfer cylinders by one position in a common direction,
    c) conveying a substance located in the transfer cylinders through a nozzle block provided with at least one opening, into an upper stationary cylinder by way of displacing a press piston allocated to a transfer cylinder, wherein the stationary cylinder is a mixing cylinder or is an extrusion cylinder in the case of a last transfer cylinder,
    d) transferring all transfer cylinders back in a common, but opposite direction,
    e) repetition of the steps a)-d).

9. A method according to claim 7, wherein in the method according to steps a-e each transfer cylinder is transferred only between two adjacent positions, wherein a position is defined by one of a substance filling-in position, mixer and an extrusion press.

10. A method according to claim 7, further comprising the step of setting a reaction temperature of a substance to be treated via a shifting of the boiling temperature of the substance, in that a mixer is set under a vacuum.

11. A method according to claim 10, wherein a vacuum is set in a homogenization step, such that a reduction of the temperature of the substance corresponds essentially exactly to a temperature increase with one passage through a nozzle block.

12. A mixing reactor for mixing and continuous extrusion of a substance, comprising:

a plurality of mixers,
an extrusion press,
a plurality of transfer cylinders,
a press piston allocated to each transfer cylinder, which even during a transfer, forms a bottom of the transfer cylinder,
a transfer vehicle for transferring the transfer cylinders, and
a computer control for individually setting of mixing parameters, in particular mixing pressure, mixing temperature and mixing speed of each mixer,
wherein the mixers and the extrusion press are connected to one another by the transfer vehicle, and wherein a substance to be treated may be transferred in a transfer cylinder from a substance filling-in position to the mixers, and to the subsequent extrusion press by means of the transfer vehicle, so that a finished mixture may be discharged from the extrusion press as a continuous product, and wherein the mixers comprise lower, transferable cylinders which correspond to the transfer cylinders and upper, stationary mixing cylinders, and wherein each transfer cylinder is equally distanced from an adjacent cylinder.

13. A method for the continuous discharge of a substance to be treated, with a mixing reactor comprising a plurality of mixers and a plurality of transfer cylinders, and each mixer comprises a lower, transferable cylinder which correspond to a transfer cylinder and an upper, stationary mixing cylinder, further comprising an extrusion press, wherein the mixers and the extrusion press are connected to one another by a transfer vehicle, the method comprising the steps of:
  a) filling a substance to be treated into a frontmost, first transfer cylinder;
  b) displacing all transfer cylinders, using the transfer device, by one position in a common direction, whereby said first transfer cylinder is displaced to a first mixing position and whereby further transfer cylinders are transferred to a further mixing position, and in the case of a last transfer cylinder, into an extrusion position;
  c) conveying a substance located in the transfer cylinders through a nozzle block provided with at least one opening, into an upper stationary cylinder by way of displacing a press piston allocated to a transfer cylinder, wherein the stationary cylinder is a mixing cylinder or in the case of a last transfer cylinder the stationary cylinder is an extrusion cylinder; and
  d) transferring all transfer cylinders back in a common, but opposite direction, and repetition of the steps a)-d);
wherein during steps a-d each transfer cylinder is only displaced between two adjacent positions and
a reaction temperature of a substance to be treated is set via a shifting of the boiling temperature of the substance, in that a mixer is set under a vacuum and said vacuum is set in a homogenization step, such that a reduction of the temperature of the substance corresponds essentially exactly to a temperature increase with one passage through a nozzle block.

* * * * *